(12) United States Patent
Luomi et al.

(10) Patent No.: US 11,714,160 B2
(45) Date of Patent: Aug. 1, 2023

(54) TRACKING OF ITEMS/ASSETS

(71) Applicant: HERE Global B.V., Eindhoven (NL)

(72) Inventors: Marko Luomi, Tampere (FI); Mika Viitala, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 416 days.

(21) Appl. No.: 16/986,033

(22) Filed: Aug. 5, 2020

(65) Prior Publication Data

US 2021/0041526 A1 Feb. 11, 2021

(30) Foreign Application Priority Data

Aug. 8, 2019 (EP) .................................. 19190762

(51) Int. Cl.
| | | |
|---|---|---|
| G01S 5/14 | (2006.01) | |
| G06Q 50/28 | (2012.01) | |
| G06F 1/3203 | (2019.01) | |
| G01S 1/08 | (2006.01) | |
| H04L 9/32 | (2006.01) | |
| H04L 9/40 | (2022.01) | |

(52) U.S. Cl.
CPC ................ G01S 5/14 (2013.01); G01S 1/08 (2013.01); G06F 1/3203 (2013.01); G06Q 50/28 (2013.01); *H04L 9/3263* (2013.01); *H04L 63/1466* (2013.01)

(58) Field of Classification Search
CPC ............ G01S 5/14; G01S 1/08; G06F 1/3203; G06Q 50/28; H04L 9/3263; H04L 63/1466
See application file for complete search history.

(56) References Cited

U.S. PATENT DOCUMENTS

| | | | |
|---|---|---|---|
| 6,148,280 | A | 11/2000 | Kramer |
| 7,809,377 | B1 | 10/2010 | Lau et al. |
| 8,299,920 | B2 | 10/2012 | Hamm et al. |
| 8,334,773 | B2 | 12/2012 | Cova et al. |
| 8,989,053 | B1* | 3/2015 | Skaaksrud ............. H04L 67/10 370/255 |
| 10,665,083 | B1* | 5/2020 | Vang ..................... G01S 1/024 |

(Continued)

OTHER PUBLICATIONS

Extended European Search Report for Application No. 19190762.5 dated Feb. 21, 2020, 12 pages.

(Continued)

*Primary Examiner* — Thomas D Alunkal
(74) *Attorney, Agent, or Firm* — Alston & Bird LLP

(57) ABSTRACT

A method is disclosed that includes associating an identifying information indicative of an item to be tracked from a first device to a second device. The method also includes assigning a master/slave information indicative of a responsibility that the first device and/or the second device is in charge of tracking the item from the first device to the second device. The method further includes determining a position estimate indicative of a position of the item to be tracked based at least partially on the identifying information and the master/slave information. The first device is directly related to the item to be tracked, and the second device is not directly to the item to be tracked. An apparatus, a tangible computer-readable medium and a system are also disclosed.

19 Claims, 4 Drawing Sheets

(56) References Cited

U.S. PATENT DOCUMENTS

| | | | | |
|---|---|---|---|---|
| 2009/0237237 A1* | 9/2009 | Brosius | .................. | G06Q 50/30 |
| | | | | 340/539.13 |
| 2010/0149028 A1* | 6/2010 | Mermet | .................. | G01S 19/14 |
| | | | | 342/357.31 |
| 2011/0055546 A1* | 3/2011 | Klassen | ................ | G06F 21/629 |
| | | | | 713/150 |
| 2013/0099920 A1* | 4/2013 | Song | .................... | G08B 21/023 |
| | | | | 340/539.13 |
| 2015/0339902 A1 | 11/2015 | Dom Nguez Latorre | | |
| 2016/0192132 A1* | 6/2016 | Stanwood | ............. | H04W 4/021 |
| | | | | 455/456.1 |
| 2018/0025603 A1* | 1/2018 | Tyler | ................. | H04W 52/0212 |
| | | | | 340/572.1 |
| 2020/0025582 A1* | 1/2020 | Jeon | ........................ | H04W 4/40 |
| 2022/0114873 A1* | 4/2022 | Williams | ........... | G08B 21/0269 |

OTHER PUBLICATIONS

Tive [online] [Retrieved May 1, 2019], Retrieved via the Internet: https://tive.co/tracker/ (2019) 9 pages.

\* cited by examiner

TRACKING OF ITEMS/ASSETS

CROSS-REFERENCE TO RELATED APPLICATIONS

This application claims priority to European Application No. 19190762.5, filed Aug. 8, 2019, the entire contents of which are incorporated herein by reference.

FIELD OF THE DISCLOSURE

The following disclosure relates to the field of positioning, or more particularly relates to systems, apparatuses, and methods for end-to-end asset tracking as well to the possibility for using different position technologies for asset tracking use cases. Moreover, the following disclosure relates precisely to cases where the logistics journey is complex and involves multiple transportation means and/or environments.

BACKGROUND

The number of devices with location capabilities is expected to grow exponentially in the next decade. This growth is in particular the result of the Internet-of-Things (IoT)-era, in which more and more devices get connected to the Internet. Soon homes, factories, cities and transportation means will be equipped with low-cost sensors that produce real-time information on various characteristics and environment variables. Moreover, the cheaper electronics enable factories and industries to equip assets and supply chains with devices, such as sensors or trackers that can provide real-time information on the flow of goods.

This basic ingredient of the IoT story is that the sensors and trackers are location-aware. The location-awareness can be achieved through two means: either the device has its own positioning capabilities (like Global Navigation Satellite System (GNSS) or cell/Wi-Fi/Bluetooth offline positioning), or the device makes measurements of the radio environment (cell/Wi-Fi/Bluetooth) and sends them to the cloud for position determination.

In a logistics end-to-end journey, for example in a case where car parts are delivered from a manufacturer to a factory where assembly takes place, such trackers can be used. Often this type of logistics journey is complicated and involves multiple different transportation means e.g. from the warehouse to a lorry, a train, a ship and again to a train and a lorry before the parts finally arrive at the factory.

It will be problematic to track the parts using only one tracking method, like a GNSS and Wi-Fi positioning based asset tracker attached to the parcel. In the described scenario the problematic cases would be those segments where the tracker is potentially inside e.g. a metallic container which blocks radio signals needed for position estimation (in this case: Wi-Fi and GNSS).

Currently, it's common for such trackers to work autonomously, both when positioning themselves and when reporting the data back to a tracking service.

SUMMARY OF SOME EXEMPLARY EMBODIMENTS

However, known solutions continue to operate in the same mode regardless of the context. In some cases, e.g. when being transported within a container, this may be inefficient and also lead to poor performance due to restricted connectivity.

It is thus, inter alia, an object of the invention to enhance efficiency of tracking of one or more items to be transported.

According to a first exemplary aspect of the present invention, a method is disclosed, the method comprising:
associating an identifying information indicative of an item to be tracked from a first device to a second device;
assigning a master/slave information indicative of a responsibility that the first device and/or the second device is in charge of tracking the item from the first device to the second device; and
determining a position estimate indicative of a position of the item to be tracked based at least partially on the identifying information and the master/slave information,
wherein the first device is directly related to the item to be tracked, and wherein the second device is not directly to the item to be tracked.

This method may for instance be performed and/or controlled by an apparatus, for instance an electronic device, e.g. an Internet-of-Things (IoT) device, a tracker, or a low capability device. For instance, the method may be performed and/or controlled by using at least one processor of the electronic device. This method may further be performed and/or controlled by more than one apparatus (e.g. at least two apparatuses), for instance at least two of above disclosed electronic devices.

According to a further exemplary aspect of the invention, a computer program is disclosed, the computer program when executed by a processor causing an apparatus, for instance the electronic device, or alternatively, a server or server cloud (e.g. a tracking server), to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The apparatus may for instance be a BT (Bluetooth)- and/or BLE (BT Low Energy) beacon, and/or a Wi-Fi access point.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:
- at least one (first) apparatus (e.g. a first device) according to the first exemplary aspect as disclosed above; and
- at least one (second) apparatus (e.g. a second device) according to the first exemplary aspect as disclosed above, wherein the first apparatus and the second apparatus are configured to perform and/or control or comprising respective means for performing and/or controlling the method according to the first exemplary aspect of the present invention as disclosed above together.

In the following, exemplary features and exemplary embodiments of all aspects of the present invention will be described in further detail.

The identifying information is indicative of an item to be tracked. The item may for instance be a physical product, e.g. an item or items, a good or goods, or an asset or assets to be transported. The item may for instance be packaged in a box, a packet, a package, a container, or the like to name but a few non-limiting examples. The item may for instance enable that an electronic device (e.g. the first device) may for instance be attachable to the item in such a way that the electronic device at least temporarily (e.g. for the duration of the item to be transported from a source location to a destination location) is directly attached to the item, e.g. by gluing or sticking the electronic device to the item.

The identifying information may for instance be represented by a number, a character string, a code, or a combination thereof, enabling the item to be (uniquely) identified. The identifying information may for instance be unique, at least during the time it takes to transport the item from a source location to a destination location along a transportation path.

The identifying information may for instance be associated from the first device to the second device, or from the second device to the first device by storing the identifying information in association with an identification information of the respective device (e.g. the first or the second device) that is considered to be responsible for the tracking of the item. Alternatively or additionally, the identifying information may for instance be associated from the first device to the second device, or from the second device to the first device by providing the identifying information in association with an identification information of the respective device (e.g. the first or the second device) that is considered to be responsible for the tracking of the item. For instance, the identifying information and a respective identification information of the respective electronic device (e.g. the first device or the second device) may for instance be output (e.g. sent) to a server, e.g. a positioning server providing services so that e.g. a third party, a user or the like can request to be provided with information representing a (e.g. current) position of the item along a transportation path. The identification information of a respective electronic device may for instance be indicative of a UID (Unique Identifier), a MAC (Medium Access Control) Address, or the like enabling the respective electronic device to be identified.

To enable that only the first device or the second device is responsible for tracking of the item, the master/slave information is assigned. For instance, both the first device and the second device may for instance store (e.g. set) a binary information (e.g. a flag/bit), wherein e.g. the binary information representing a value of "0" may be indicative of a slave status, and the binary information representing a value of "1" may be indicative of a master status, meaning that the respective electronic device (e.g. the first device or the second device) being associated with the master status is considered to be responsible for the tracking of the item, while the other electronic device (assigned with the slave status) is not responsible for the tracking. Thus, the latter may be enabled to enter a power saving mode, to name but one non-limiting example.

The master/slave information may for instance be assigned at the end of both electronic devices (e.g. the first and the second device). Alternatively, only one electronic device may for instance be assigned with the master/slave information so that said electronic device may perform and/or control the tracking of the item by performing and/or controlling the method according to the first exemplary aspect of the present invention.

According to an exemplary embodiment of all exemplary aspects of the present invention, the identifying information is associated from the second device to the first device, and further, the master/slave information is assigned from the second device to the first device.

Thus, the responsibility for the tracking of the item may for instance be changed back and forth between the first device and the second device. This may also be referred to as "automatic mode change".

Further, the position estimate is determined. The position estimate is indicative of a position of the item to be tracked, e.g. along a transportation path. Of course, more than one position estimate indicative of a (e.g. current) position of the item to be tracked may be determined. For instance, one or more position estimates may be determined, wherein each position estimate of the one or more position estimates is determined after an elapsing of a pre-defined time period (e.g. every 5 min, 10 min, 30 min, 1 hour, 2 hours, 4 hours, or more, to name but a few non-limiting examples).

The position estimate is determined, or the one or more position estimates are determined based at least partially on the identifying information and the master/slave information, e.g. by considering the master/slave information so that only the respective electronic device (e.g. the first device or the second device) that is responsible for the tracking of the item determines the respective position estimate(s). Further, the position estimate is determined, or the one or more position estimates are determined based at least partially on the identifying information and the master/slave information, e.g. by considering the identifying information enabling that the respective position estimate(s) that are determined are linked to the item via the respective identifying information of the item.

The first device is directly related to the item to be tracked, e.g. by being attached to the item. Further, the first device may be limited to the tracking of the item to which it is related. Other items may not be trackable be the first device. The second device is not directly related to the item to be tracked, e.g. by not being directly attached to the item so that more than one item may be tracked by the second device.

The method may for instance be performed and/or controlled by a low capability device, e.g. not comprising or being connectable to a user input device (e.g. keypad, touchpad, or the like to name but a few non-limiting examples), and/or a display, e.g. for displaying information, e.g. to a user. The method may for instance be controlled by the first device and/or the second device. Thus, the first device and/or the second device may for instance be low capability devices. Such a low capability device may for instance be an IoT device, or a tracker, to name but a few non-limiting examples. The first device may for instance be comprised by one or more physical products (e.g. the item, or other goods or assets to be transported, such as a box, a wooden pallet, or the like). The first device is also referred to as "normal tracker". The second device is also referred to as "gateway tracker" since the second device enables functions of a gateway.

The position estimate is indicative of a position (or location) of the respective electronic device (e.g. the first device or the second device) that has determined the respective position estimate. The respective position estimate may for instance be determined by estimating or calculating the position estimate. The current position of the respective electronic device (e.g. the first device or the second device) may for instance be comprised by or represented by the respective position estimate. In case one or more position estimates are determined, a respective position estimate may for instance be determined a plurality of times, e.g. a respective (e.g. updated or new) position estimate is determined again and again, e.g. after the pre-defined time period has elapsed (also referred to as location update interval).

Such a location update interval e.g. associated with the respective electronic device determining one or more position estimates may define a frequency indicating how often the position of the respective electronic device is estimated in a pre-defined time period or indicating the time period between two subsequent determinations of position estimates. For instance, the location update interval associated with the respective electronic device (e.g. the first device or the second device) may represent a mean interval between two consecutive position estimate instants. As a non-limiting example, the location update interval may indicate how frequently the position of the electronic device is determined (e.g. estimated), e.g. in terms of a time interval between two consecutive position estimations of the respective electronic device.

In this way, end-to-end asset tracking, e.g. of items or physical products to be shipped, is enhanced. In particular, where a logistics journey is complex and e.g. involves multiple transportation means and environments, such end-to-end asset tracking is enhanced since in case a tracker of an asset is shielded, it is enabled to switch or change to a so-called gateway tracker (e.g. the second device) which is configured to receive one or more signals enabling a tracking even if the asset to be tracked is shielded (e.g. being located, at least temporarily during a logistics journey, in a container or the like).

For instance, the item to be tracked may be part of and/or may be moved by a movable entity (e.g. transportation means), wherein the movable entity may be a vehicle, e.g. a car or a truck respectively a lorry, or a motorbike, or a freighter or any other suitable vehicle, or a bike or a person that carries the respective item, to name but a few non-limiting examples. The first device being directly related to the item may be configured to determine its position (e.g. its location), as disclosed above. Further, the item may be loaded into a container to be transported e.g. by a ship, to name but one non-limiting example. The container may be related with the second device in such a way that the second device is enabled to determine one or more position estimates while the item to be tracked is located inside of the container. The first device and the second device may comprise means for determining the position of the respective electronic devices, e.g. based on signals received from at least one GNSS satellite system, for example based on signals received from Global Positioning System (GPS) satellites, from BeiDou satellites, from GLONASS satellites or from Galileo satellites or other satellites, to name but a few non-limiting examples. As an example, the respective electronic devices may comprise a GNSS receiver in order to receive signals from the GNSS system such that electronic device of the at least one electronic device can estimate its position based on the GNSS signals, and/or, as an example, the respective electronic devices may comprise a cellular and/or Wi-Fi and/or Bluetooth receiver in order to receive signals from at least one cellular system, and/or from at least one Wi-Fi system and/or from at least one Bluetooth system.

Further, the means for determining the position may comprise means for estimating the position based on the received GNSS signals, and/or on the received cellular signals, and/or on the received Wi-Fi signals, and/or on the received BT signals, wherein in the latter cases the respective electronic devices may be considered to have own positioning capabilities. Thus, the respective electronic devices may be configured to make measurements of the radio environment, e.g. measurements of the cellular signals and/or of the Wi-Fi signals and/or measurements of the BT signals (e.g. represented by a fingerprint information) and which can be used by the electronic device to estimate the position of respective electronic device. For instance, the respective electronic device(s) may be configured to make measurements of the radio environment, e.g. measurements of the cellular signals and/or of the Wi-Fi signals and/or measurements of the BT signals, and may be configured to transmit at least a part of the measurements to a cloud or server, e.g. via a wireless connection, such that the cloud or the server may estimate the respective electronic device's position based on the measurements received from the electronic device. Such measurements may for instance be comprised or represented by a fingerprint information. Then, for instance, the server cloud or the server may be configured to transmit the estimated position back to the respective electronic device.

According to an exemplary embodiment of all exemplary aspects of the present invention, the method further comprises:

outputting the position estimate.

Furthermore and optionally, a respective determined position estimate may for instance be output, e.g. to an entity from which e.g. an obtained request (e.g. of at least one server, e.g. a positioning server providing tracking services of the item) stems, or to another entity that is different from the first device or the second device, and which transmits (e.g. relays) the determined position estimate to a user that has requested the respective position estimate of the item. The position estimate may for instance be output via the communication interface(s) of the apparatus(es) performing and/or controlling the method according to the first exemplary aspect of the present invention, e.g. the first device and/or the second device.

According to an exemplary embodiment of all exemplary aspects of the present invention, the second device that is not directly related to the item to be tracked is further configured to track a plurality of items.

For instance, the second device may track, and thus, determine a plurality of position estimates for each item to which it is responsible for the respective tracking. For instance, the plurality of items may be located within a container, and the second devices determines a position estimate, which is then indicative of the position of the plurality of items located in the container. Thus, the second device determines its own position estimate respectively a position estimate indicative of its own position, thus, the position of the second device.

According to an exemplary embodiment of all exemplary aspects of the present invention, the second device is related to the item in such a way that the second device is enabled to observe one or more signals outside of a material that at least partially shields the item to be tracked from one or more signals to be observable by the first device that is directly related to the item to be tracked, wherein at least partially based on the one or more signals observable by the second tracked the position estimate is determined.

The second device may for instance be configured to determine the position estimate, or one or more position estimates based on GNSS positioning and/or non-GNSS positioning. For instance, the second device may be configured to determine the position estimate, or the one or more position estimates with GNSS and Wi-Fi positioning, to name but one non-limiting example. Since e.g. the first device may be directly related (e.g. attached) to the item which should be tracked, and the container in which the item is located may shield the first device so that it may not be able to observe one or more radio signals, the second device may for instance be not directly related to the item to be tracked, e.g. by being attached to the respective (e.g. metal) container in such a way that at least a GNSS antenna comprised by or connectable to the second device is outside of the container. In this way, the second device is enabled to determine the position estimate, or the one or more position estimates based on signals observable by the GNSS antenna.

According to an exemplary embodiment of all exemplary aspects of the present invention, the item is a good (e.g. a physical product) to be transported via one or more different transportation means.

The item may be formed by one or more physical products (e.g. items, goods, or assets to be transported, e.g. a box, a packet, a package, wooden pallets, a container, or the like to name but a few non-limiting examples), e.g. a plurality of physical products stored on a wooden pallet. Further, the first device may be considered to be directly related to an item comprised by such a wooden pallet in case the first device is intended to track all of the items of the wooden pallet as a whole. Within the meaning of the present invention, then all of the items together of the wooden pallet are considered to represent "one" item to be tracked by the respective first device by being directly related (e.g. attached) to the wooden pallet comprising all of the items.

A respective transportation means may for instance be a vehicle may for instance be a truck respectively lorry, a ship (e.g. a container ship), a train (e.g. a freight train), a delivery van, a delivery bike (e.g. motorbike, or bicycles, or electric bicycle), an airplane (e.g. a cargo plane), or the like, to name but a few non-limiting examples.

According to an exemplary embodiment of all exemplary aspects of the present invention, the master/slave information is assigned to the second device in case the first device does not observe any signals so that the first device is prevented from determining the position estimate.

The assigning of the master/slave information from the first device to the second device so that the second device is responsible for the tracking of the item may for instance be triggered to be performed and/or controlled in case the first device does not observe any (e.g. radio) signals and may therefore be prevented from respectively be unable to determining the position estimate. Of course, a second device is required to be in the vicinity of the first device so that the assigning of the master/slave information can be performed and/or controlled. To ensure that the second device is in the vicinity of the first device, the second device may for instance advertise its presence, as is disclosed below in more detail.

According to an exemplary embodiment of all exemplary aspects of the present invention, the master/slave information is assigned to the second device in case the first device receives one or more pieces of advertisement information indicative of the presence of the second device (or another second device), wherein the one or more pieces of advertisement information are broadcasted by the second device.

For instance, the assigning of the master/slave information from the first device to the second device may for instance take place in case the first device has received one or more pieces of advertisement information from a respective second device (e.g. the second device) prior to a point of not receiving such one or more signals. Thus, in case the first device is prevented from determining (e.g. an updated) position estimate (e.g. due to a shielding of one or more signals), and has then received one or more pieces of advertisement information, the master/slave information may for instance be assigned from the first device to the second device. It will be understood that in case the master/slave information is assigned from the first device to the second device so that the second device is responsible for the tracking, in the same way, the identifying information is associated with the second device as well.

Further, the assigning of the identifying information may for instance take place in case the first device has received one or more pieces of advertisement information from a respective second device, and not requiring any further (e.g. pre-) conditions.

The one or more pieces of advertisement information may for instance be BLE advertisement messages. A respective piece of advertisement information may for instance comprise an identifier of the respective second device that has sent the one or more pieces of advertisement information.

The second device may for instance advertise availability respectively its presence to one or more electronic devices (e.g. the first device, or a plurality of first device, e.g. located inside of a container, to name but one non-limiting example). The advertising via the respective advertisement information may for instance be realized by sending one or more of such messages respectively information. In some cases, the second device may for instance advertise availability, e.g. to the first device seeking a signal to assign the second device with the master/slave information and to associate the identifying information of the item to be tracked to the second device. The one or more pieces of advertisement information may for instance be sent e.g. via broadcasting of one or more (e.g. radio) signals. Such signals may for instance convey information in the form of packets of pre-defined format. The information may for instance be indicative of at least an identification information of the (respective) second device. The identification information of the (respective) second device may for instance enable an electronic device (e.g. the first device) to identify the (respective) second device, e.g. so that the master/slave information can be assigned accordingly, and the identifying information of the item to be tracked can be associated with the second device as well. The second device, respectively the one or more pieces of advertisement information sent by the second device may for instance be visible to or observable by any electronic device with suitable radio interface, regardless of whether or not they are known to the (respective) second device.

According to an exemplary embodiment of all exemplary aspects of the present invention, the master/slave information is assigned to the first device or second device in case the first device starts or stops receiving one or more pieces of advertisement information sent by the second device.

Optionally, this assigning of the master/slave information to the first device or second device may for instance be performed and/or controlled (e.g. determined to which device of the first device or the second device the master/slave information is to be assigned) by a (e.g. tracking) server, to name but one non-limiting example. Such a tracking server may for instance be enabled (e.g. configured) to perform and/or control at least the associating of the identifying information to the first device or the second device. Further, such a tracking server may for instance be enabled to perform and/or control at least assigning of the master/slave information to the first device or second device. In example embodiments according to all aspects of the present invention, such a tracking server may for instance be part of the second device.

For instance, the first device may for instance decide to start, stop or start tracking independently, when it stops or starts receiving (e.g. hearing) the one or more pieces of advertisement information (e.g. advertisement message(s)) from the second device. In this case, e.g. the tracking server may for instance notice this and assign the master/slave roles as represented by the master/slave information correctly.

According to an exemplary embodiment of all exemplary aspects of the present invention, the assigning and/or the associating is performed and/or controlled via radio signaling between the first device and the second device.

The automatic mode change may for instance require communication between a normal tracker (e.g. first device) and a gateway tracker (e.g. the second device). This communication may be based on radio signaling, e.g. Wi-Fi or BT signaling, to name but a few non-limiting examples. The respective electronic devices, e.g. the first device and the second device, comprise or are connectable to respective communication interface(s) enabling such radio signaling.

According to an exemplary embodiment of all exemplary aspects of the present invention, the first device and/or the second device are a BT- and/or BLE-beacon, and/or a Wi-Fi access point.

The first device and/or the second device may for instance be portable (e.g. weigh less than 1, 0.5, 0.4, 0.2, or 0.1 kg). The first device and/or the second device may for instance be a limited capability device, e.g. such as an IoT-device, or a tracker. The first device and/or the second device may for instance comprise or be connectable to one or more sensors for determining the respective devices position, such as for instance a magnetic field receiver. The first device and/or the second device may for instance comprise or be connectable to a receiver and/or a transmitter (e.g. a transceiver) for receiving and/or sending data and/or information. For instance, the first device and/or the second device may comprise one or more radio receivers (e.g. radio transceivers, e.g. cellular radio transceivers), which may for instance enable the method according to the first exemplary aspect of the present invention to be performed and/or controlled. The first device and/or the second device may for instance be suitable for outdoor and/or indoor navigation respectively positioning. The first device and/or the second device may for instance comprise or be connectable to means for storing information, e.g. a memory for storing at least the part of the set of geofences.

In case the first device and/or the second device are BT- and/or BLE-beacons, the first device and/or the second device may be stand-alone devices or be integrated into or attached to a respective item to be tracked. Such BT- and/or BLE-beacons may in particular be operable in a low energy mode that requires comparably little energy. Further, the use of BLE by the first device and/or the second device may enable a positioning with limited energy consumption at all involved devices.

A BT- and/or BLE beacon that is employed for the present invention may be any kind of BT- and/or BLE beacon complying with any present or future standard. The BT- and/or BLE standards are specified by the Bluetooth Special Interest Group and are presently available under https://www.bluetooth.com/.

In case the first device and/or the second device are access points (e.g. each respective device is a router) of a WLAN, such an access point of a WLAN may comprise a WLAN radio interface, which for example includes a WLAN transceiver. The WLAN radio interface may be configured to transmit and/or receive WLAN radio signals. Accordingly, the radio signal transmitted by such an access point of a WLAN may be a WLAN radio signal. Like BT- and/or BLE technologies, WLAN technologies are supported by many electronic devices by default such as most smartphones, most tablet computers, most notebook computers, most smart watches and most smart bands, etc. WLAN is for example specified by the standards of the IEEE 802.11 family (http://www.ieee.org/).

It is to be understood, however, that other types of radio devices than variations of BT- and/or BLE beacons and/or WLAN access points may be used as well, for example tags or other devices that are configured to transmit ultra-wide-band (UWB) signals or any wireless radio signals that might emerge in the future.

According to an exemplary embodiment of all exemplary aspects of the present invention, the method further comprises:
  checking the validity of the second device upon reception of the one or more pieces of advertisement information, wherein the master/slave information is assigned from the first device to the second device, or vice versa, only in case the checking of the validity was successful.

This step may for instance be performed and/or controlled by the first device, since checking its own validity may be unnecessary for the second device.

The checking of the validity of the second device may for instance be based on a PKI (Public Key Infrastructure) and/or a signature of the one or more pieces of advertisement information sent by the second device.

Prior to the broadcasting of the one or more pieces of advertisement information, the second device may for instance sign the one or more pieces of advertisement information, e.g. by using a signature. Then, e.g. a public/private key method/procedure may for instance be performed and/or controlled between the first device and the second device. The one or more pieces of advertisement information may for instance then be encrypted by using a public key.

After the first device has obtained (e.g. received) the one or more pieces of advertisement information, optionally decrypted the one or more pieces of advertisement information, e.g. based on a private key stored on the side of the first device (or in case of a plurality of first devices: stored by each of the plurality of first devices), the validity of the obtained one or more pieces of advertisement information is checked so that no unauthorized third party may for instance be enabled to fake the presence of a/the second device.

All keys (e.g. public and/or private key) that are required for a respective signing of one or more pieces of advertisement information by the respective entities, e.g. of a system according to an exemplary aspect of the present invention, may only be used by the respective first device(s) and the second device, because otherwise, e.g. inconsistencies would arise and would be detected by the checking of the validity.

Additionally or alternatively, the checking of the validity may for instance comprise authenticating the second device from which the one or more pieces of advertisement information were received.

According to an exemplary embodiment of all exemplary aspects of the present invention, the method further comprises:

gathering one or more pieces of sensor information indicative of sensor and/or telemetry data gathered (e.g. measured) by the first and/or second device comprising or being connectable to the means gathering the one or more pieces of sensor information, wherein the checking of the validity is further based on the one or more pieces of sensor information.

The first device and/or the second device may for instance comprise or be connectable to one or more sensors, e.g. in the form of an accelerometer and/or a gyroscope for gathering (e.g. measuring) further information (e.g. radio measurements).

Further, the first device and/or the second device may for instance make measurements of the radio environment (e.g. based on radio signals of cell, Wi-Fi, BT, or a combination thereof) and send them to a server, or server cloud providing positioning services for position determination (e.g. receiving a position estimate in return).

According to an exemplary embodiment of all exemplary aspects of the present invention, the first device and/or the second device are enabled to switch into (e.g. or switch on/off) a power consumption saving operation mode.

From a power respective energy consumption point of view, it is often beneficial to switch off or turn the first device in a power saving operation mode while the second device is responsible for the positioning. This may further minimize also the need for other data transmission between the first device, and one or more other devices, such as a positioning server or server cloud, to name but one non-limiting example.

According to an exemplary embodiment of all exemplary aspects of the present invention, the method further comprises:

associating the identifying information and assigning the master/slave information to the first device in case the first device does not observe previously observed one or more pieces of advertisement information.

In case the first device does not observe previously observed one or more pieces of advertisement information that were sent by the second device, it can be considered that the item to be tracked and which is directly related to the first device is not located in the vicinity of the second device anymore. In case the first device has turned on a power saving operation mode, it may for instance be ensured that the first device performs and/or controls wake-up periods in which one or more pieces of advertisement information sent (e.g. broadcast) by the second device are expected to be observable. Then, in case the first device does not observe previously observed one or more pieces of advertisement information, the first device is configured respectively enabled to (e.g. automatically) switch back (by itself, thus, autonomously) to the determining respective position estimate(s) by itself, since the second device is not present or not present anymore. This may for instance be performed and/or controlled by associating the identifying information of the item to be tracked back to it, and by assigning the master/slave information back to it, by itself, wherein the master/slave information represents that the first device is (now) responsible for the tracking. Such an (e.g. automatic) switch back may for instance be provided as a respective information (e.g. to be generated) to a positioning server so that the positioning server may perform the communication with the (previously responsible) second device accordingly.

According to an exemplary embodiment of all exemplary aspects of the present invention, the method further comprises:

associating the identifying information and assigning the master/slave information based on entering or exiting at least one pre-defined geofence.

A respective geofence may for instance be a virtual perimeter of a real-world geographical area. Entering or exiting the perimeter by the first device and/or the second device may for instance trigger at least one (e.g. pre-defined) action respectively geofence action. Triggering of at least one action may for instance also be referred to as geofencing. Such geofencing, as used herein, may for instance refer to (an act of) triggering at least one (e.g. pre-defined) action when first device and/or the second device enters or exits a geofence perimeter, e.g. physically moves into or out of a defined geographical area. For instance, a geofence may be set around an area-of-interest or, if the geofence is of type line, the geofence may define a kind of border, e.g. a country border or any other well-suited border.

Evaluating of a respective geofence may for instance be understood to mean that a position estimate is determined by the respective apparatus (first device and/or the second device) according to all exemplary aspects of the present invention. Thus, the first device and/or the second device may for instance be configured to estimate (e.g. determine)—in case the evaluating of a respective geofence is performed and/or controlled by the first device and/or the second device itself—or to cause estimating (e.g. determining)—in case the evaluating of a respective geofence is performed and/or controlled by a server or server cloud (e.g. also being provided as a service by a positioning server, e.g. the positioning server as disclosed above)—a position at which the first device and/or the second device is located. The position estimate may for instance be determined (e.g. estimated) at least partially based on a non-GNSS-based positioning system or GNSS-based positioning system.

For instance, each time a respective position estimate is determined, it may for instance be assessed whether or not the position as represented by the respective position estimate represents a position within the boundaries of a respective geofence. This assessing may for instance be performed and/or controlled by the first device and/or the second device themselves. In this case, the first device and/or the second device may for instance have stored information necessary to assess a respective geofence. Alternatively, each time a respective position estimate is determined, it may for instance be assessed whether or not the position as represented by the respective position estimate represents a position within the boundaries of a respective geofence by a server or server cloud (e.g. providing such assessing of a respective geofence as a service, e.g. by the positioning server as disclosed above).

Then, in case the position is within respective boundaries of a respective geofence, at least one action can be triggered (e.g. by the apparatus performing and/or controlling the method according to the first exemplary aspect of the present invention), e.g. a user or recipient of the item to be tracked may for instance be informed of the current position of the item.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
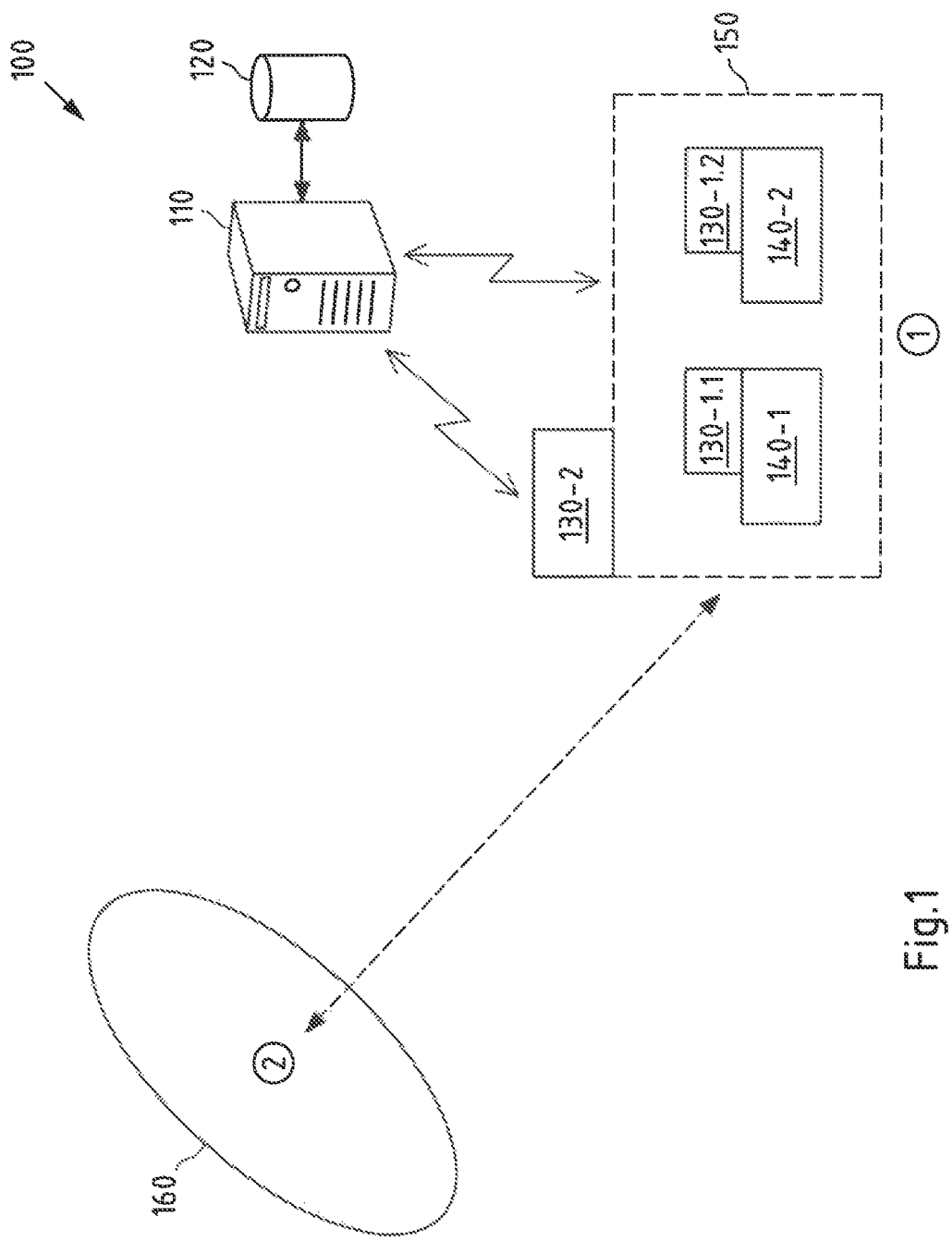
FIG. 1 is a schematic block diagram of a system according to an exemplary aspect of the present invention.

FIG. 1 is a schematic high-level block diagram of a system 100 according to an exemplary aspect of the present invention. Such a system 100 may for instance represent a generic system architecture as used by one or more exemplary embodiments according to all exemplary aspects of the present invention.

System 100 comprises an optional server 110, an optional database 120, and at least one electronic device (in particular a low capability device, or an IoT device, or a tracker) 130. In FIG. 1, two of such electronic devices that are trackers 130-1.1 and 130-1.2, and another one of such an electronic device that is another tracker 130-2 are shown. Further, two items 140-1 and 140-2 to be tracked by the trackers 130-1.1 and 130-1.2, 130-2 are shown. Tracker 130-1.1 is configured to track item 140-1. Tracker 130-1.2 is configured to track item 140-2. Tracker 130-1.1 is attached to the item 140-1. Tracker 130-1.2 is attached to the item 140-2. The items can be located inside of a container 150. The encircled number 1 in FIG. 1 schematically illustrates a first position along a transportation path of the items 140-1, 140-2, and the encircled number 2 illustrates a second position along the transportation path. Of course, further positions along such a transportation path are possible. The encircled number 2 is further located within a geofence 160, which is illustrated by a respective (geographic) area with the shown boundaries. The boundaries of the geofence 160 can be of different shapes. For instance, in case trackers 130-1.1 and 130-1.2, 130-2 enter or exit the boundaries of the geofence 160, one or more actions, e.g. to output (e.g. send) a position estimate to the server 110 may for instance be triggered. That the trackers 130-1.1 and 130-1.2, 130-2 can move in and out of the geofence 160 is illustrated by the dotted double arrows between the illustrated positions between the encircled numbers 1 and 2.

The server 110 may alternatively be embodied as a server cloud (e.g. a plurality of server connected, e.g. via a communication network such as the Internet, and providing services at least partially jointly. The server 110, which may for instance be embodied as a positioning server or tracking server, as disclosed above in the summary section, may for instance be further configured to receive one or more position estimates determined by the trackers 130-1.1, 130-1.2, and 130-2.

The database 120 may for instance be optional. The database 120 may for instance comprise a memory, e.g. for storing one or more position estimates indicative of the respective positions of the trackers 130-1.1, 130-1.2, and 130-2 so that it may for instance be obtainable from this information where a respective item is or has progressed along a/the transportation path, or is currently located.

The system 100 may for instance enable the following example embodiments according to all aspects of the present invention:

It is enabled to follow a journey of a single asset along a transportation path, e.g. by using a system that has at least two different types of trackers (e.g. type i) or "normal" trackers 130-1.1 and 130-1.2, and type ii) or "gateway" trackers 130-2) and where the identity of the trackable item as well as responsibility to perform the tracking transfers automatically between the different type of trackers.

In a simple example, two types of trackers may for instance be comprised:

"normal" asset trackers (e.g. tracker 130-1.1 or 130-1.2) with GNSS and Wi-Fi positioning that are attached to items (e.g. parcels) that may for instance include car parts;

"gateway" trackers (e.g. tracker 130-2) with GNSS and Wi-Fi positioning that are attached to metal containers (e.g. container 150) in such a way that at least a GNSS antenna is outside the container.

Now the segments of the journey with e.g. a lorry may be tracked with a "normal tracker" (e.g. first device 130-1.1 or 130-1.2) and the segments where the asset is inside a container (e.g. train-ship-train) would be tracked using the respective gateway trackers (e.g. second device 130-2), wherein in the latter case, a determined position estimate of the tracker 130-2 is indicative of the same position for both of the items 140-1 and 140-2.

The responsibility of the tracking may for instance shift from the normal autonomous tracker (performed and/or controlled by the respective trackers 130-1.1 of item 140-1, and 130-1.2 of item 140-2) to the gateway tracker mode (performed by tracker 130-2 for both items 140-1 and 140-2). This may for instance happen automatically when the item(s) (e.g. asset(s) to be tracked) 140-1, 140-2 with the normal tracker is loaded to the container 150. Similarly, the responsibility may for instance be returned back to the normal tracker from the gateway tracker when the item(s) 140-1, 1402 is (are) unloaded from the container 150.

The automatic mode change communication between the normal tracker (e.g. tracker 130-1.1 and/or 130-1.2) and the gateway tracker (e.g. tracker 130-2) may be based on radio signaling. A respective gateway tracker may be broadcasting its presence e.g. using BLE advertisement messages (e.g. one or more pieces of advertisement information). The message(s) may for instance contain identity information of the respective tracker (e.g. tracker 130-2) which enable nearby trackers (such as the two tracker 130-1.1 and/or 130-1.2 in case the trackers are in the vicinity of tracker 130-2) to detect them. The message(s) may for instance also contain some sort of signature (e.g. based on PKI), e.g. to prevent spoofing and other malicious use. After a tracker (such as the two trackers 130-1.1 and 130-1.2) has detected the presence of a valid gateway tracker (e.g. tracker 130-2), it may for instance change its mode to e.g. BLE based broadcast mode where the tracker identity is embedded in the advertisement message similar to a gateway. The message(s) may again contain signature based on PKI or some other means to authenticate the source. Optionally, the message may also include sensor or other telemetry data produced by the tracker, here the trackers 130-1.1 and 130-1.2. When the gateway tracker (e.g. tracker 130-2) obtains (e.g. receives) the message, it may for instance forward the respective information to a tracking service (e.g. as provided by server 110), e.g. optionally together with positioning and potentially other sensor information captured by itself.

Further, positioning and internet connectivity may be delegated to the gateway tracker (e.g. tracker 130-2). Because the positioning and internet connectivity are delegated to the gateway tracker 130-2, since the items 140-1, 140-2 are located inside of the container 150, the other tracker(s) (such as the two shown trackers 130-1.1 and 130-1.2) may for instance be able to reduce its battery consumption by switching off all unnecessary modules (e.g. GNSS, cell/Wi-Fi scan, internet connectivity).

The tracker(s) (such as the two shown trackers 130-1 and 130-1.2) may for instance continue to listen to the advertisement message(s) sent by the gateway tracker (e.g. tracker 130-2) in order to be able to automatically switch back to the autonomous mode when the gateway tracker is not present anymore.

In some cases it may be necessary for the respective tracker(s) to change its behavior based on its location (e.g. when entering/exiting a geofence). For this reason the gateway tracker (e.g. tracker 130-2) may for instance include its latest position to the advertisement message(s) it sends or broadcasts to make the nearby tracker(s) (such as the two shown trackers 130-1.1 and 130-1.2) aware of their position.

During the logistics journey, there may for instance be multiple switches between autonomous and gateway modes of the respective trackers. Also the trackers may for instance connect to different gateway trackers (such as tracker 130-2) during the transportation/journey.

The location and optionally the sensor data in a respective message (e.g. in a respective advertisement message sent by the tracker(s) 130-1.1 and 130-1.2) may be encrypted using e.g. PKI in order to prevent their capture by unauthorized entities.

The communication between a respective gateway tracker (e.g. tracker 130-2) and the normal trackers (e.g. trackers 130-1.1 and 130-1.2) could be based on some other radio technology and protocol beside BLE advertisement message(s). The changes between autonomous and gateway mode may also be triggered manually if the respective tracker(s) provide such interface or the mode may be controlled remotely by the tracking service (e.g. as provided by server 110).

In this way, it is enabled a possibility to track and trace items/assets accurate and reliable when the logistics journey includes segments that require trackers with different hardware capability and/or form factor.

Figure 2:
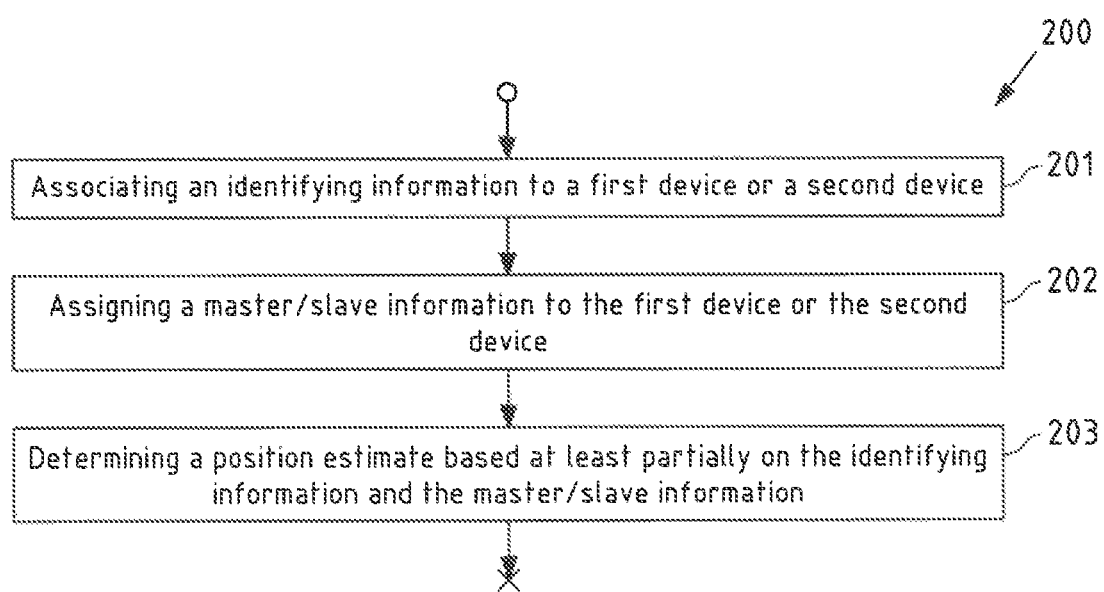
FIG. 2 is a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a first device 130-1.1 and/or 130-1.2 of FIG. 1 and/or a second device 130-2 of FIG. 1.

In a first step 201, an identifying information is associated. The identifying information may for instance be associated to the first device, or to the second device so that the first device and/or the second device are respectively aware of which item/asset they are tracking.

In a second step 202, a master/slave information is assigned. The master/slave information may for instance be assigned from the first device to the second device in case the first device may for instance not be enabled (e.g. anymore) to track an item/asset. This may for instance be due to being loaded e.g. into a container shielding the first device from one or more radio signals based on which a position estimate can be determined. The second device may for instance be located in relation e.g. to the container in such a way that the second device can still observe one or more radio signals so that the second device is enabled to determine a position estimate. The master/slave information may for instance be assigned from the second device to the first device in case e.g. the item/asset with the first device being attached to item/asset is unloaded from the container, to name but one non-limiting example.

In a third step 203, a position estimate is determined based, at least partially, on the master/slave information. Thus, the first device may for instance determine the position estimate in case according to the master/slave information, the first device is the master and thus in charge of determining a position estimate. Further, the second device may for instance determine the position estimate in case according to the master/slave information, the second device is the master and thus in charge of determining a position estimate.

Any of the steps 201 to 203 may for instance be performed multiple times (e.g. at least twice). Further, the steps 201 to 203 may for instance be performed and/or controlled in a different sequence than being illustrated by flowchart 200.

Figure 3:
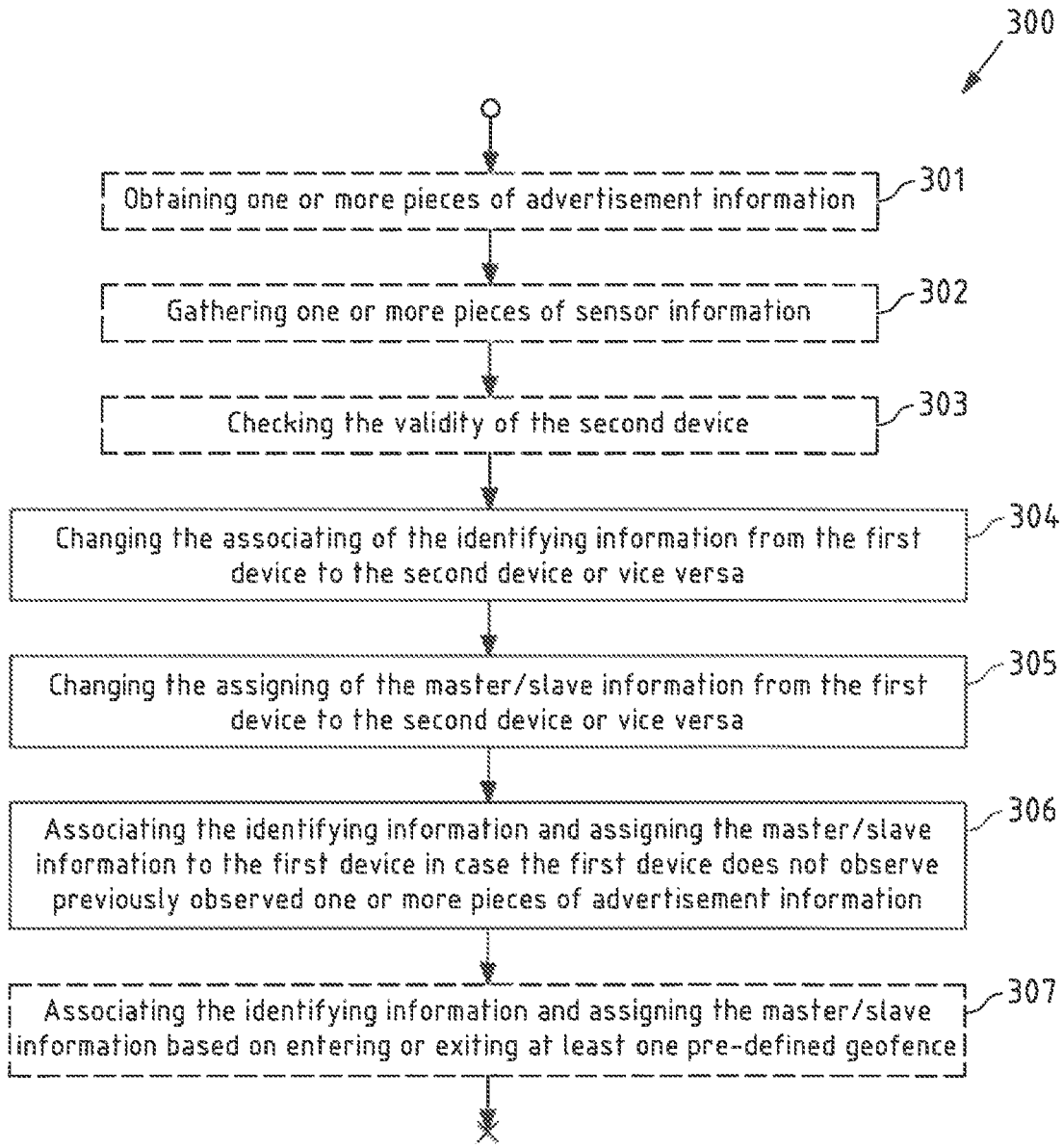
FIG. 3 is a flowchart showing an example embodiment of a method according to the first exemplary aspect of the present invention to be performed and/or controlled in addition to the flowchart of FIG. 2.

FIG. 3 is a flowchart 300 showing an example embodiment of a method according to the first exemplary aspect of the present invention to be performed and/or controlled in addition to the flowchart 200 of FIG. 2. This flowchart 300 may for instance be performed by a first device 130-1.1 and/or 130-1.2 of FIG. 1 and/or a second device 130-2 of FIG. 1. Any of the steps 301 to 307 may for instance be performed prior, subsequent or in parallel to any of the step 201 to 203 of the flowchart 200 of FIG. 2.

In an optional first step 301, one or more pieces of advertisement information are obtained. The one or more pieces of advertisement information may for instance be obtained by receiving the one or more pieces of advertisement information. The one or more pieces of advertisement information may for instance be obtained in case flowchart 300 is performed and/or controlled by a respective first device (e.g. trackers 130-1.1, 130-1.2, 130-2 of FIG. 1). The one or more pieces of advertisement may for instance be sent by a respective second device (e.g. tracker 130-2 of FIG. 1).

In an optional second step 302, one or more pieces of sensor information may for instance be obtained by gathering (e.g. measuring) the one or more pieces of sensor information. The one or more pieces of sensor information may for instance be measured by one or more sensors comprised by or connectable to the first device and/or second device. The one or more pieces of sensor information may for instance be obtained by receiving the one or more pieces of sensor information. For instance, a respective first device may gather (e.g. measure) the one or more pieces of sensor information, and then output (e.g. send) the one or more pieces of sensor information to a respective second device (e.g. the second device in case flowchart 300 is performed and/or controlled by the second device) so that the second device receives the one or more pieces of sensor information.

In an optional third step 303, the validity of the second device is checked, e.g. prior to the associating (see step 201 of FIG. 2) and the assigning (see step 202 of FIG. 2). For instance, a signature may for instance be checked, e.g. since one or more pieces of advertisement information (see step 301) are signed with this signature.

In a fourth step 304, the associating of the identifying information is changed from the first device to the second device, or vice versa, depending on whether the first device or the second device performs and/or controls the flowchart 300.

In a fifth step 305, the assigning of the master/slave information is changed from the first device to the second device, or vice versa, depending on whether the first device or the second device performs and/or controls the flowchart 300.

In a sixth step 306, the identifying information is associated to the first device in case the first device does not observe previously observed one or more pieces of advertisement information. Further, the master/slave information is assigned to the first device in case the first device does not observe previously observed one or more pieces of advertisement information. Thus, e.g. in case the first device being attached to an item/asset is unloaded from a container, wherein the first device may for instance have observed one or more signals from a respective second device being attached to the container, such signals sent from the respective second device are not observable anymore by the first device. Therefore, the associating and the assigning can be changed (e.g. back) to the first device.

In a seventh step 307, the identifying information is associated to the first device or to the second device, and further, the master/slave information is assigned to the first device, in case a geofence (e.g. geofence 160 of FIG. 1) is entered or exited. For instance, in case an item/asset to be tracked is loaded onto a ship, a respective geofence may for instance define that a respective second device is now responsible for the tracking of the item/asset. Accordingly, the identifying information can be associated to the respective second device, and further, the master/slave information can be assigned to the respective second device as well.

Figure 4:
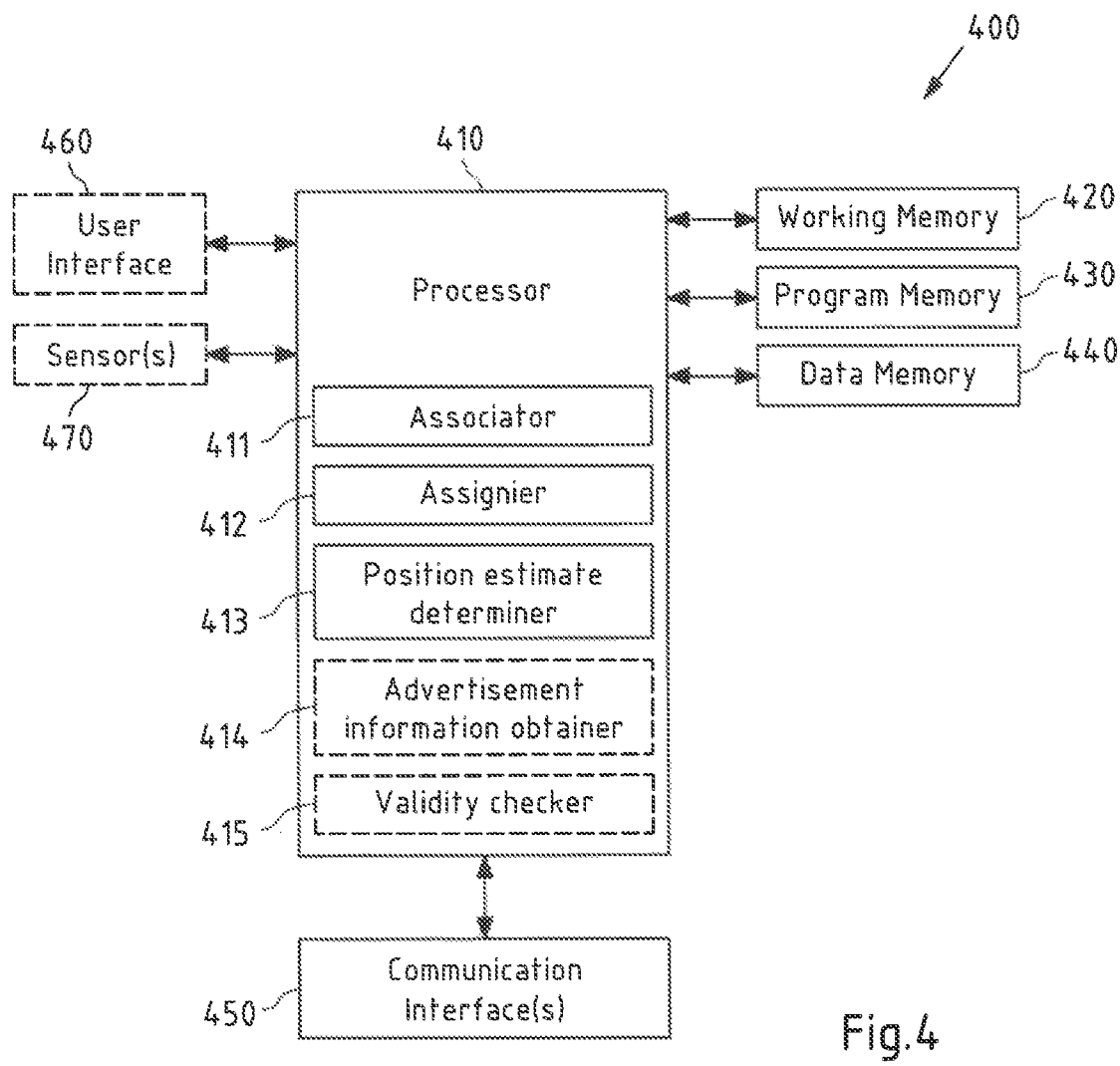
FIG. 4 is a schematic block diagram of an apparatus configured to perform the method according to the first exemplary aspect of the present invention.

FIG. 4 is a schematic block diagram of an apparatus 400 according to an exemplary aspect of the present invention, which may for instance represent the first device 130-1.1, 130-1.2, or the second device 130-2 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect of the present invention. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise an associator 411 as a functional and/or structural unit. Associator 411 may for instance be configured to associate an identifying information to a device that is different from the apparatus 400 (see step 201 of FIG. 2, steps 304, 306, 307 of FIG. 3).

Processor 410 may for instance comprise an assigner 412 as a functional and/or structural unit. Assigner 412 may for instance be configured to assign a master/slave information to a device that is different from the apparatus 400 (see step 202 of FIG. 2, step 305, 306, 307 of FIG. 3).

Processor 410 may for instance comprise a position estimate determiner 413 as a functional and/or structural unit. Position estimate determiner 413 may for instance be configured to determine (e.g. estimate) one or more positon estimates representing a position of the apparatus 400 (see step 203 of FIG. 2).

Processor 410 may for instance comprise an optional advertisement information obtainer 414 as a functional and/or structural unit. Optional advertisement information obtainer 414 may for instance be configured to obtain (e.g. receive) one or more pieces of advertisement information from a device that is different from the apparatus 400 (see step 301 of FIG. 3).

Processor 410 may for instance comprise an optional validity checker 415 as a functional and/or structural unit. Optional validity checker 415 may for instance be configured to check the validity of a device that is different from the apparatus 400, e.g. prior to associating an identifying information and/or assigning the master/slave information to the device that is different from the apparatus 400 (see step 303 of FIG. 3).

Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of identifying information, one or more pieces of master/slave information, one or more position estimates, one or more pieces of advertisement information, one or more pieces of sensor information, one or more results of checking one or more validities, or a combination thereof, to name but a few non-limiting examples.

Communication interface(s) 450 enable apparatus 400 to communicate with other entities, e.g. with device 130-2 of FIG. 1 in case apparatus 400 represents device 130-1.1 or 130-1.2, or vice versa. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with one or more servers (e.g. server 110 of FIG. 1).

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather (e.g. measure) pressure information indicative of an altitude value (e.g. relative or absolute altitude value above sea level). Sensor(s) 470 may for instance comprise an accelerometer, gyroscope, inertial sensor, or a combination thereof, e.g. to gather (e.g. measure) respective piece(s) of information indicative of a movement and/or orientation of the apparatus 400.

Some or all of the components of the apparatus 400 may for instance be connected via a bus. Some or all of the components of the apparatus 400 may for instance be combined into one or more modules.

The following embodiments shall also be considered to be disclosed:

EMBODIMENT 1

An apparatus comprising at least one processor and at least one memory including computer program code, the at least one memory and the computer program code configured to, with the at least one processor, cause the apparatus to at least perform:
associating an identifying information indicative of an item to be tracked to a second device (e.g. another apparatus according to any of the embodiments 1 to 14);
assigning a master/slave information indicative of a responsibility that the apparatus and/or the second device is in charge of tracking the item to the second device; and
determining a position estimate indicative of a position of the item to be tracked based at least partially on the identifying information and the master/slave information,
wherein the apparatus is directly related to the item to be tracked, and wherein the second device is not directly to the item to be tracked.

EMBODIMENT 2

The apparatus according to embodiment 1, wherein the second device that is not directly related to the item to be tracked is further configured to track a plurality of items.

EMBODIMENT 3

The apparatus according to any of the preceding embodiments, wherein the second device is related to the item in such a way that the second device is enabled to observe one or more signals outside of a material that at least partially shields the item to be tracked from one or more signals to be observable by the apparatus that is directly related to the item to be tracked, wherein at least partially based on the one or more signals observable by the second tracked the position estimate is determined.

EMBODIMENT 4

The apparatus according to any of the preceding embodiments, wherein the identifying information is associated from the second device to the apparatus, and further, the master/slave information is assigned from the second device to the apparatus.

EMBODIMENT 5

The apparatus according to any of the preceding embodiments, wherein the item is a good to be transported via one or more different transportation means (e.g. transportation vehicles).

EMBODIMENT 6

The apparatus according to any of the preceding embodiments, wherein the master/slave information is assigned to the second device in case the apparatus does not observe any signals so that the apparatus is prevented from determining the position estimate.

EMBODIMENT 7

The apparatus according to any of the preceding embodiments, wherein the master/slave information is assigned to the second device in case the apparatus receives one or more pieces of advertisement information indicative of the presence of the second device, wherein the one or more pieces of advertisement information are broadcasted by the second device.

EMBODIMENT 8

The apparatus according to any of the preceding embodiments, wherein the master/slave information is assigned to the first device or second device in case the first device starts or stops receiving one or more pieces of advertisement information sent by the second device.

EMBODIMENT 9

The apparatus according to any of the preceding embodiments, wherein the assigning and/or the associating is performed and/or controlled via radio signaling between the apparatus and the second device.

EMBODIMENT 10

The apparatus according to any of the preceding embodiments, wherein the apparatus and/or the second device is a BT- and/or BLE-beacon, and/or a Wi-Fi access point.

EMBODIMENT 11

The apparatus according to any of the embodiments 7 to 10, the at least one memory and the computer program code configured to, with the at least one processor, cause the apparatus further to perform:
checking the validity of the second device upon reception of the one or more pieces of advertisement information, wherein the master/slave information is assigned from the apparatus to the second device, or vice versa, only in case the checking of the validity was successful.

EMBODIMENT 12

The apparatus according to embodiment 11, the at least one memory and the computer program code configured to, with the at least one processor, cause the apparatus further to perform:
gathering one or more pieces of sensor information indicative of sensor and/or telemetry data gathered by the apparatus and/or the second device comprising or being connectable to the means gathering the one or more pieces of sensor information, wherein the checking of the validity is further based on the one or more pieces of sensor information.

EMBODIMENT 13

The apparatus according to any of the preceding embodiments, wherein the apparatus and/or the second device are enabled to switch into a power consumption saving operation mode.

EMBODIMENT 14

The apparatus according to any of the preceding embodiments, the at least one memory and the computer program code configured to, with the at least one processor, cause the apparatus further to perform:
associating the identifying information and assigning the master/slave information to the apparatus in case the apparatus does not observe previously observed one or more pieces of advertisement information.

EMBODIMENT 15

The apparatus according to any of the preceding embodiments, the at least one memory and the computer program code configured to, with the at least one processor, cause the apparatus further to perform:
associating the identifying information and assigning the master/slave information based on entering or exiting at least one pre-defined geofence.

EMBODIMENT 16

An apparatus comprising at least one processor and at least one memory including computer program code, the at least one memory and the computer program code configured to, with the at least one processor, cause an apparatus at least to perform and/or control the method of any of the embodiments 1 to 15.

EMBODIMENT 17

A tangible computer-readable medium storing computer program code, the computer program code when executed by a processor causing an apparatus to perform and/or control:
associating an identifying information indicative of an item to be tracked to a second device;
assigning a master/slave information indicative of a responsibility that the apparatus and/or the second device is in charge of tracking the item to the second device;
determining a position estimate indicative of a position of the item to be tracked based at least partially on the identifying information and the master/slave information,
wherein the apparatus is directly related to the item to be tracked, and wherein the second device is not directly to the item to be tracked.

EMBODIMENT 18

The tangible computer-readable medium according to embodiment 17, further cause the apparatus at least to perform and/or control the method of any of the embodiments 1 to 15.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
    associating an identifying information indicative of an item to be tracked from a first device to a second device;
    assigning a master/slave information indicative of a responsibility that the first device and/or the second device is in charge of tracking the item from the first device to the second device, wherein associating the identifying information and assigning the master/slave information is based at least in part on the first device and/or the second device entering or exiting at least one predefined geofence, and wherein the at least one predefined geofence is associated with a virtual perimeter of a real-world geographical area; and
    determining a position estimate indicative of a position of the item to be tracked based at least partially on the identifying information and the master/slave information,
    wherein the first device is directly related to the item to be tracked, and wherein the second device is not directly related to the item to be tracked.

2. The method according to claim 1, wherein the second device that is not directly related to the item to be tracked is further configured to track a plurality of items.

3. The method according to claim 1, wherein the second device is related to the item in such a way that the second device is enabled to observe one or more signals outside of a material that at least partially shields the item to be tracked from one or more signals to be observable by the first device that is directly related to the item to be tracked, and wherein at least partially based on the one or more signals observable by the second device the position estimate is determined.

4. The method according to claim 1, wherein the identifying information is associated from the second device to the first device, and further, the master/slave information is assigned from the second device to the first device.

5. The method according to claim 1, wherein the item is a good to be transported via one or more different transportation means.

6. The method according to claim 1, wherein the master/slave information is assigned to the second device in case the first device does not observe any signals so that the first device is prevented from determining the position estimate.

7. The method according to claim 1, wherein the master/slave information is assigned to the second device in case the first device receives one or more pieces of advertisement information indicative of the presence of the second device, wherein the one or more pieces of advertisement information are broadcasted by the second device, and wherein the one or more pieces of advertisement information are encrypted.

8. The method according to claim 1, wherein the assigning and/or the associating is performed and/or controlled via radio signaling between the first device and the second device.

9. The method according to claim 1, wherein the first device and/or the second device is a (Bluetooth) BT- and/or (BT Low Energy) BLE-beacon, and/or a Wi-Fi access point.

10. The method according to claim 7, further comprising:
    checking the validity of the second device upon reception of the one or more pieces of advertisement information, wherein the master/slave information is assigned from the first device to the second device, or vice versa, only in case the checking of the validity was successful.

11. The method according to claim 10, further comprising:
    gathering one or more pieces of sensor information indicative of sensor and/or telemetry data gathered by the first and/or second device comprising or being connectable to means for gathering the one or more pieces of sensor information, wherein the checking of the validity is further based on the one or more pieces of sensor information.

12. The method according to claim 1, wherein the first device and/or the second device are enabled to switch into a power consumption saving operation mode.

13. The method according to claim 7, further comprising:
    associating the identifying information and assigning the master/slave information to the first device in case the first device does not observe previously observed one or more pieces of advertisement information.

14. An apparatus comprising at least one processor and at least one memory including computer program code, the at least one memory and the computer program code configured to, with the at least one processor, cause the apparatus to at least perform:
- associating an identifying information indicative of an item to be tracked to a second device;
- assigning a master/slave information indicative of a responsibility that the apparatus and/or the second device is in charge of tracking the item to the second device, wherein associating the identifying information and assigning the master/slave information is based at least in part on the first device and/or the second device entering or exiting at least one predefined geofence, and wherein the at least one predefined geofence is associated with a virtual perimeter of a real-world geographical area; and
- determining a position estimate indicative of a position of the item to be tracked based at least partially on the identifying information and the master/slave information,
- wherein the apparatus is directly related to the item to be tracked, and wherein the second device is not directly related to the item to be tracked.

15. The apparatus according to claim 14, wherein the master/slave information is assigned to the second device in case the apparatus does not observe any signals so that the apparatus is prevented from determining the position estimate.

16. The apparatus according to claim 14, wherein the master/slave information is assigned to the second device in case the apparatus receives one or more pieces of advertisement information indicative of the presence of the second device, wherein the one or more pieces of advertisement information are broadcasted by the second device, and wherein the one or more pieces of advertisement information are encrypted.

17. The apparatus according to claim 16 wherein the at least one memory and the computer program code are further configured to, with the at least one processor, cause the apparatus to:

check the validity of the second device upon reception of the one or more pieces of advertisement information, wherein the master/slave information is assigned from the apparatus to the second device, or vice versa, only in case the checking of the validity was successful.

18. The apparatus according to claim 17, wherein the at least one memory and the computer program code are further configured to, with the at least one processor, cause the apparatus to:
- gather one or more pieces of sensor information indicative of sensor and/or telemetry data gathered by the apparatus and/or the second device comprising or being connectable to means for gathering the one or more pieces of sensor information, wherein the checking of the validity is further based on the one or more pieces of sensor information.

19. A non-transitory computer-readable medium storing computer program code, wherein the computer program code, when executed by a processor, causes an apparatus to:
- associate an identifying information indicative of an item to be tracked to a second device;
- assign a master/slave information indicative of a responsibility that the apparatus and/or the second device is in charge of tracking the item to the second device, wherein associating the identifying information and assigning the master/slave information is based at least in part on the first device and/or the second device entering or exiting at least one predefined geofence, and wherein the at least one predefined geofence is associated with a virtual perimeter of a real-world geographical area; and
- determine a position estimate indicative of a position of the item to be tracked based at least partially on the identifying information and the master/slave information,
- wherein the apparatus is directly related to the item to be tracked, and wherein the second device is not directly related to the item to be tracked.

\* \* \* \* \*